UNITED STATES PATENT OFFICE.

WILLIAM SCOTT BASKIN, OF CORNING, NEW YORK.

COMPOUND FOR CLEANING BOILERS.

SPECIFICATION forming part of Letters Patent No. 345,206, dated July 6, 1886.

Application filed March 20, 1886. Serial No. 195,973. (No specimens.)

*To all whom it may concern:*

Be it known that I, WILLIAM SCOTT BASKIN, of Corning, in the county of Steuben and State of New York, have invented a new and Improved Compound for Cleaning Boilers, of which the following is a full, clear, and exact description.

My improved composition consists of the following ingredients, combined in about the proportions stated, viz: saltpeter, (nitrate of potash,) four pounds; white vitriol, (sulphate of zinc,) one pound. These ingredients are mixed together in crystallized form and placed in the boiler and allowed to dissolve; or they may be dissolved in water and introduced by the boiler-feed pump.

I do not confine myself to the exact proportion of ingredients herein stated, as the proportion may be varied within wide limits without materially affecting the efficiency of the compound.

It is well known that scale adhering to the boiler-shell, to the flues, and flue-sheets prevents the water from coming into direct contact with the iron, and thus impairs the efficiency of the boiler. It also permits the heat to act destructively on the iron, as the water is not allowed to come in contact with the iron, to carry away the heat.

My improved compound loosens old and hard scale, and prevents the formation of new scale in the boiler.

Having thus fully described my invention, what I claim as new, and desire to secure by Letters Patent, is—

The herein-described mixture, to be used for removing scale from boilers, and for preventing its formation, the same consisting of saltpeter and white vitriol combined in about the proportions stated.

WILLIAM SCOTT BASKIN.

Witnesses:
WM. A. FOSTER,
H. N. HAMMOND.